May 12, 1953      D. G. POSSON      2,638,130
METHOD OF MAKING ELASTIC WEBBING AND PRODUCT THEREOF
Filed March 7, 1950      3 Sheets-Sheet 1

Inventor,
Donald G. Posson,
by Dike, Calver + Porter
Attys.

May 12, 1953  D. G. POSSON  2,638,130
METHOD OF MAKING ELASTIC WEBBING AND PRODUCT THEREOF
Filed March 7, 1950  3 Sheets-Sheet 2

Inventor,
Donald G. Posson,
by Dike, Calver & Porter
Atty's.

Patented May 12, 1953

2,638,130

UNITED STATES PATENT OFFICE 2,638,130

METHOD OF MAKING ELASTIC WEBBING AND PRODUCT THEREOF

Donald G. Posson, Needham, Mass.

Application March 7, 1950, Serial No. 148,059

12 Claims. (Cl. 139—421)

This invention relates a method of making elastic webbing, and the product thereof.

The elastic webbing made by this method is a substantially stretchable slip-resisting elastic webbing, which carries exposed and uncovered elastic warp threads raised above the surface of the webbing. The purpose of the exposed elastic warp threads carried above the surface of the webbing is to provide a non-slipping or slip-resisting fabric.

Elastic webbing which stretches, such as suspender and garter webbing, is, of course, old and well-known. Such webbing includes unstretchable fiber warp threads, of cotton, rayon or the like, and body warp threads of rubber, which lie within the body of the webbing and are covered and enclosed by the filling threads, which are also of fiber, such as cotton, rayon, or silk. Such a webbing has no exposed and uncovered rubber warp threads raised above its surface, and while it is woven with the warp threads stretched or under tension, it presents no problems of curling, twisting or puckering of the webbing, because the rubber warps are evenly spaced across the width of the web and are woven under a uniform tension.

It is likewise old to make a non-stretchable slip resisting webbing, having non-stretchable warp threads, such as cotton, rayon, or the like, and which carries exposed and uncovered rubber warp threads raised on one surface. Such a non-stretchable webbing is shown in Chisholm Patent No. 1,666,686, granted April 17, 1928 for Fabric. In such webbing, the exposed and raised rubber warp threads are woven without tension or with the least tension possible, to prevent the fabric from curling, twisting and puckering.

It has heretofore been thought impossible to make an elastic slip-resisting webbing, which would be substantially stretchable (i. e. having extensible rubber warp threads in the body of the web and having exposed rubber raised on one or both surfaces) because of the impossibility of making the webbing lie flat, and prevent it from curling, twisting and puckering. Unless an elastic webbing lies flat, and has no tendency to curl or twist, it is not, of course, a commercial, or practical product. Nevertheless, I have been able to overcome the problems involved and have succeeded in making such a non-slipping elastic webbing, which lies flat and has no tendency to curl, twist or pucker, and have done this by the method described herein.

I have discovered that the solution of the problem lies in weaving the webbing while the elastic body warp threads are held under the substantial tension and the exposed and raised rubber warp threads are held under a lesser tension, so that when the webbing leaves the loom, the tensions of the two elastic warp threads balance each other, and the uneven pulling and contracting of the two rubber warps, which causes curling, twisting and puckering of the webbing, is avoided. Naturally the tensions of the two rubber warps necessary for balancing will differ with the particular weave and with the number of body warps in proportion to the number of exposed and raised warps.

As an illustration of my method adapted to weaving a narrow webbing of a particular construction, which includes non-stretchable fiber warp threads of cotton, rayon, nylon or the like, the covered body warp threads of rubber are woven while under tension, or stretched to approximately 70% of their maximum stretchability or elastic limit, and the uncovered exposed warp threads of rubber raised above both surfaces of the webbing, are also woven while under tension and stretched to approximately 50% of their maximum stretchability. In this manner and for this construction the tensions of the rubber warp threads are balanced in the webbing, and on leaving the loom, the webbing lies flat and has no tendency to curl, twist or pucker. The webbing thus makes a fully stretchable, non-slipping elastic webbing, which is commercially practical, and highly satisfactory in use, and has many uses. A particular and important use is its use as a stretchable inner belt for supporting a pair of trousers, slacks, trunks or a skirt which belt is mounted inside of the waistband of the garment whereby its resiliency permits stretching and its slip-resisting surface tends to keep a shirt or shirtwaist from pulling or sliding up at the waist. Heretofore such inner belts have been non-resilient and non-stretchable, with all the limitations and disadvantages of such an inextensible construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 3:
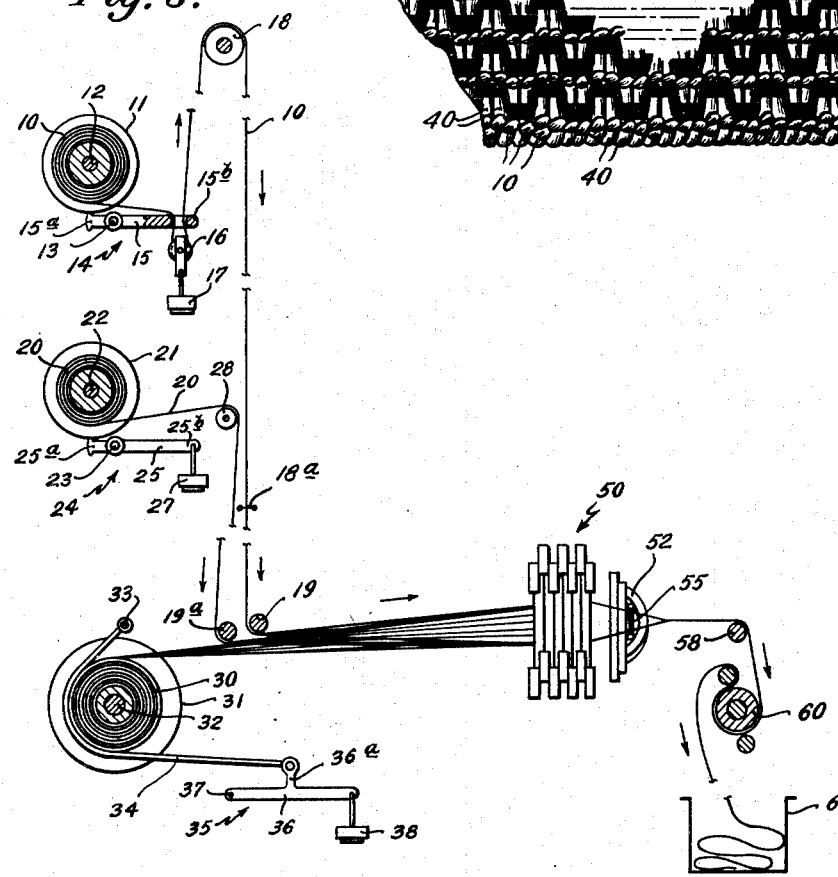
Fig. 3 is a diagrammatic representation of a loom showing the method of weaving my elastic webbing.

In the drawings 10 represents the binder warp threads of fiber, such as cotton, rayon, nylon and the like, 20 represents the rubber body warp threads and 30 represents the exposed rubber cord warp threads and 40 represents the filling threads. In Fig. 3 is a diagrammatic representation of a loom showing my method of weaving my elastic webbing, wherein the inextensible binder warp thread 10 is wound on suitable spools or packages 11 and rotatably mounted on a spindle 12 fixed to the frame of the machine, from which the thread 10 is unwound and drawn off as required. A suitable tension device generally indicated at 14 is pivotally mounted on the frame and places a drag or tension on the spool 11, whereby the binder warp thread 10 is held taut at all times. As shown the tension device 14 comprises an arm 15 pivoted at 13, and the rear end 15a of which frictionally engages the flanged end of the spool 11. The forward end 15b of the arm 15 carries a tension roll 16 and weight 17, whereby tension placed on the yarn 10 may be varied and adjusted as desired. The spools 11 of binder warp threads 10 are, of course, repeated as often as necessary to provide the desired number of binder warp threads for the particular webbing being woven. As shown the binder warp threads 10 are drawn over roller 18 through back reed 18a and under whip roll 19 to be delivered to the heddles 50 for weaving. The rubber body warp threads 20 are similarly woven on spools 21 rotatably mounted on spindles 22 carried on the back rack of the loom and are drawn off over a roll 28 and under a whip roll 19a to the haddles 50. Again a tension device generally indicated at 24 is provided for placing a tension on the rubber body warp threads 20. The tension device 24 again comprises an arm 25 pivotally mounted at 23 and the rear end of which 25a frictionally engages the flanged end of the spool 21 to provide a drag on it as it is unwound. Again a weight 27 attached to the front end 25b of the arm 25 provides means for varying the tension placed on the rubber body warp threads 20. In this particular instance the tension placed on the body warp threads 20 is such that the body warp threads are stretched to approximately 71% of its maximum stretchability or its elastic limit. The rubber thread 20 normally used in elastic webbing has a maximum stretch of about 875% of its normal length, or 8¾ times its normal length, and the tension placed on the rubber body warp threads 20 is approximately 70 to 75% of its maximum stretchability or elastic limit, or 625% of its normal length without tension. Again the number of spools or ends of the rubber body warp threads 20 is repeated to provide the desired number of body warp threads 20 required for the particular webbing being woven.

The exposed rubber cord warps 30 are similarly wound on a suitable spool or other package 31 rotatably mounted on a spindle 32 fixed to the frame of the loom. Again a suitable tension device generally indicated at 35 is provided for placing proper tension upon the exposed rubber cord warps 30, which in this instance comprises a fabric apron 34 which frictionally engages the surface of spool 31, the rear end of which is attached to rod 33 and at its other end is attached to the pivoted arm 36 pivoted at its rear end on pivot 37. An upright arm 36a is connected to the other end of apron 34 and again an adjustable weight 38 provides means for varying the tension placed on the rubber cord warp threads 30. Again the spools of exposed rubber cord warps are repeated to provide the required number of rubber cord warps 30 required for the particular elastic webbing being woven. In this instance the tension which is placed on the rubber cord warps 30 is such that the rubber threads 30 are stretched to approximately 50% of the maximum stretchability or approximately 435% above normal length. Thus the difference in the tensions provided for the rubber body warp threads 20 and exposed rubber cord warp threads 30 is proportionately in the order of approximately three to two, or the tension placed on the rubber body warp threads 20 is about half as much again or 50% more than that placed on the exposed rubber warp threads 30. While the difference in tension between the two rubber warp threads 20 and 30 will vary with the particular weave, the tension placed on the rubber body warp threads 20 is substantially more than that placed on the exposed warp threads 30, and the precise difference in the necessary tension can be readily determined by experimentation, to see that the tensions balance in the finished elastic webbing, to allow it to lie flat and without a tendency to twist, curl or crinkle.

As is customary in weaving elastic webbing and as shown in Fig. 3, it will be understood that the inextensible binder warp threads 10, the rubber body warp threads 20 and the exposed rubber cord warp threads 30 are carried in parallel relation through the heddles 50 of the loom where the warp threads are lifted by their respective heddles in accordance with the determined design of the webbing, and a shuttle 52 passes a quill 55 carrying the inextensible filling yarn 40 of rayon, nylon or the like through the warp threads, to weave the elastic webbing in the usual manner. The webbing passes over roller 58 around knee roll 60 and thence into the basket or other container 62.

Figure 1:
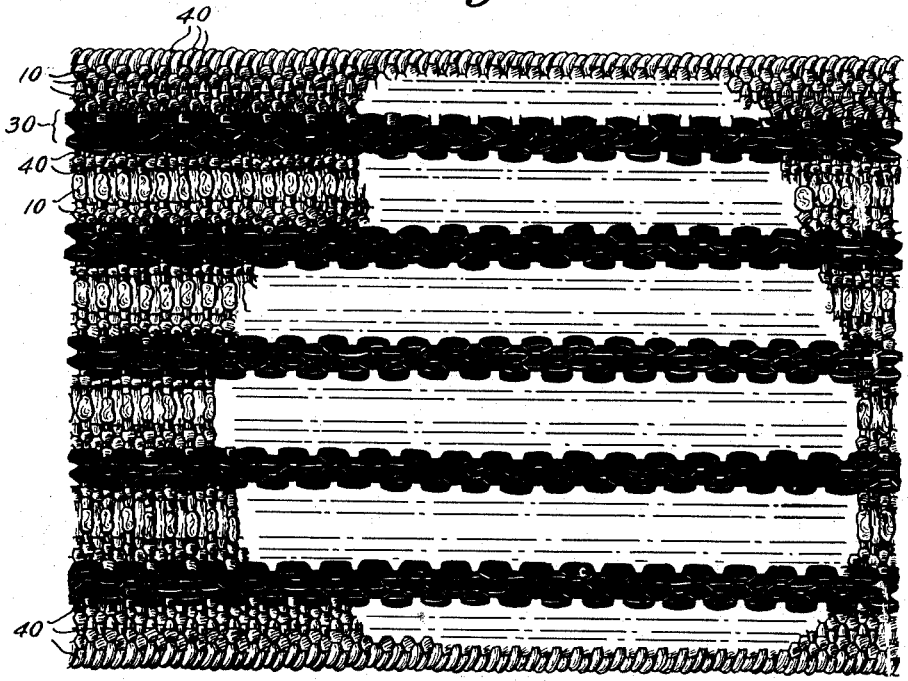
Fig. 1 is a plan pictorial view of a strip of one form of my elastic webbing.
Figure 2:
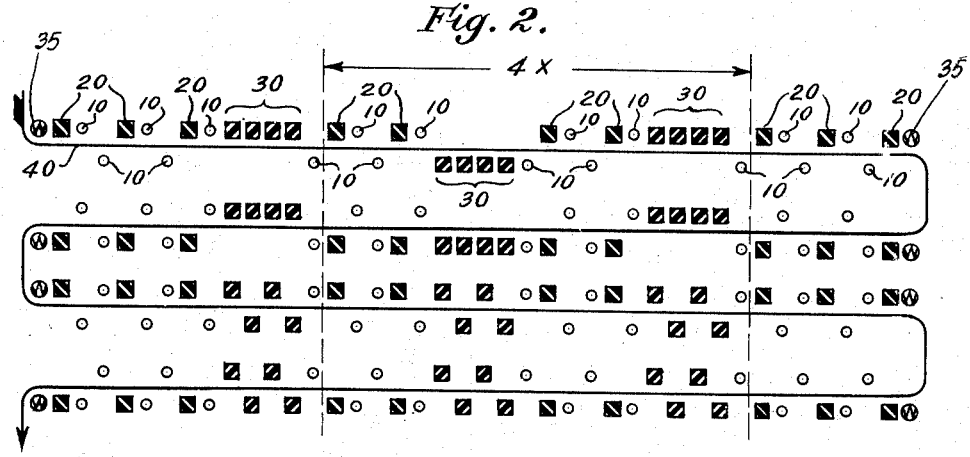
Fig. 2 is a weaving diagram in cross section of the webbing shown in Fig. 1.

As an illustration of a specific form of elastic webbing having rubber body warp threads and exposed rubber cord warp threads, and which thus provides a stretchable and slip-resisting elastic webbing, one form is shown in plan view in Fig. 1 and in weaving diagram in Fig. 2. In Figs. 1 and 2 inextensible fiber binder warp threads are shown at 10, the rubber body warp threads which are covered by the filling yarn 40, are shown at 20 and the exposed cord rubber warps which "float" on or are raised above the body of the webbing are shown at 30. In this form of webbing five spaced rows of exposed rubber cord warp threads 30 are shown on the top side of the webbing, and it will be understood that four similar rows are provided on the underside between the five rows shown in the top side. As the weaving diagram in Fig. 2 shows a wire 35 is provided at the outer edges of the webbing around which the filling yarn 40 is passed. It will be understood that the wire 35 is withdrawn as the woven webbing advances through the loom. In Fig. 2 four picks of the weave for making the webbing shown in Fig. 1 are shown, after which the design is repeated. Starting at the left in Fig. 2 it will be noted that the first pick of filling yarn 40 first passes under and over the wire 35, and over and under the binder warps 10, rubber body warps 20 and rubber cord warps 30 as indicated. The weave shown between the dotted vertical lines is then repeated four times and the border is then woven as indicated at the right edge of Fig. 2. It will be noted that the filling 40 passes over binder warps 10 and rubber body warps 20 and covers them, and that the cord rubber warps 30 are above the filling thread 40 six times and under it two times, thus leaving it exposed or "floating" above the surface of the webbing. The exposed cord rubber warps 30 thus provide the non-slipping surface for the webbing.

Figure 4:
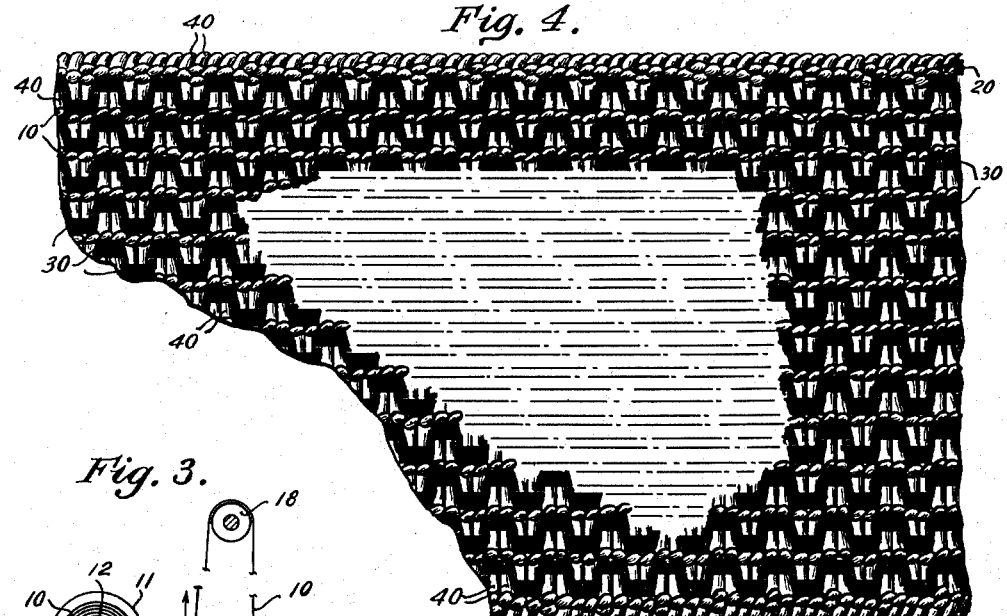
Fig. 4 is a plan pictorial view of a strip of the second form of my elastic webbing.
Figure 5:
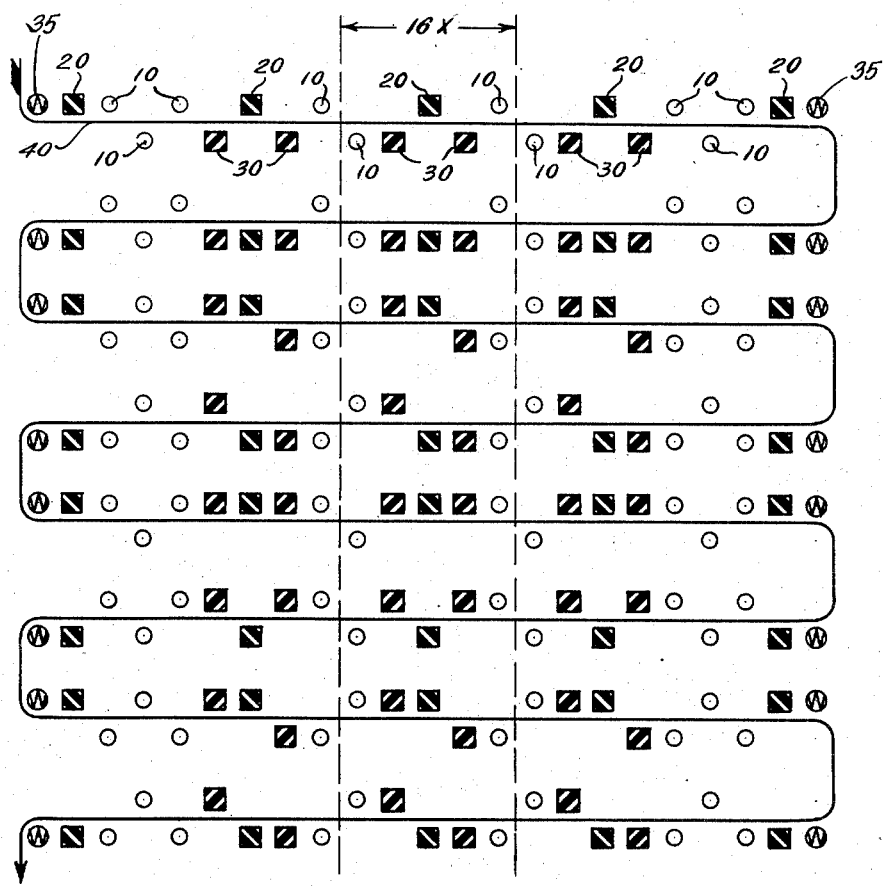
Fig. 5 is a weaving diagram in cross section of the webbing shown in Fig. 4.

In Fig. 4 a second form of elastic webbing is shown which again includes inextensible fiber binder warps 10, rubber body warps 20, exposed rubber cord warps 30 and filling 40. This second form of elastic webbing differs specifically in that the exposed rubber cord warps 30 are arranged singly and are uniformly distributed over the webbing, rather than in grouped rows. The exposed rubber cord warps 30 thus provide a non-slipping surface uniformly over the elastic webbing on both sides, and not in spaced rows only. The specific weave again is shown in the weaving diagram in Fig. 5 and it will be apparent from the diagram, which shows eight consecutive picks in cross section, how the filling yarn 40 alternately passes over and under respective binder warps 10 and rubber body warps 20. As indicated in Fig. 5 the weave pattern shown between the dotted vertical lines is repeated sixteen times, but it will, of course, be understood that the number of times the center weave is repeated is dependent on width of webbing desired. Again the binder warps 10 and rubber body warps 20 are entirely covered by the filling yarn 40 and the rubber cord warps 30 are exposed and raised above the surface of the webbing to provide a non-slipping surface. As with the form of webbing shown in Figs. 1 and 2, the webbing is woven while the rubber body warps 20 are stretched from 70 to 75% of their maximum stretch and the rubber cord warps 30 are stretched to approximately 50% of their maximum stretch.

It will be understood that the particular weaving design of my stretchable elastic webbing having a non-slipping surface can be varied indefinitely and that the tensions under which the rubber body warps 20 and the exposed cord rubber warps 30 are woven will also vary with the particular weave, to secure the necessary balance between tensions of the two rubber warp threads. The rubber body warps 20, however, to provide the proper balance of tensions should be substantially and in the order of 50% greater than that of the exposed rubber cord warps 30, and roughly in the order of 3 to 2, or 7 to 5. It will be further understood, of course, that my elastic webbing is not limited in width to a narrow fabric, but that my webbing can be broadened to any width desired for the particular purpose intended.

The rubber body warps 20 and exposed rubber cord warps 30 may be round or square in cross section as desired, but the exposed rubber cord warps 30 are preferably square cut as shown in Figs. 2 and 5 to provide a more effective non-slipping raised surface.

It will thus be seen that by properly balancing the tensions in the manner disclosed herein between the rubber body warp threads 20 and exposed warp cord threads 30, it is possible to provide a fully stretchable non-slipping elastic fabric, which will lie flat and not have a tendency to curl, twist or crinkle. It will be further noted that my stretchable slip-resisting webbing has obvious advantages in its use as an elastic innerbelt for supporting trousers or a skirt, in that it will yield and stretch with the movement of the body of the wearer, and that the tension of the belt will be independent of the waistband of the trousers (or skirt) and therefore will snugly fit the waist of the wearer at all times regardless of his (or her) movement of the position of his (or her) body, and at the same time will prevent or tend to prevent the shirt (or shirtwaist) from pulling up at the waistband.

I claim:

1. The method of weaving a slip-resisting elastic webbing having inextensible body warp threads, extensible body warp threads and exposed extensible warp threads raised above the body of the webbing, which consists in interweaving a filling yarn with said warp threads while holding the inextensible body warp threads taut, and while holding the extensible body warp threads and the exposed extensible warp threads under tension, with the extensible body warp threads stretched to a greater tension than the exposed extensible warp threads, whereby the tensions of the extended warp threads in the webbing are balanced.

2. The method of weaving a slip-resisting elastic webbing having inextensible body warp threads, extensible body warp threads and exposed extensible warp threads raised above the body of the webbing, which consists in interweaving a filling yarn with said warp threads, wherein during the weaving the inextensible body warp threads are held taut, and the extensible warp threads are held under tension, with the extensible body warp threads held under proportionately greater tension than that of the exposed extensible warp threads whereby the tensions of the extended warp threads in the webbing are balanced.

3. The method of weaving a slip-resisting elastic webbing having inextensible body warp threads, extensible body warp threads and exposed extensible warp threads raised above the body of the webbing, which consists in interweaving a filling yarn with said warp threads, wherein during the weaving the inextensible body warp threads are held taut, and the extensible warp threads are held under tension, with the extensible body warp threads held under greater tension than that of the exposed extensible warp threads in the proportion of approximately 3 to 2 whereby the tensions of the extended warp threads in the webbing are balanced.

4. The method of weaving a slip-resisting elastic webbing having inextensible body warp threads, extensible body warp threads and exposed extensible warp threads raised above the body of the webbing, which consists in interweaving a filling yarn with said warp threads, wherein during the weaving the inextensible body warp threads are held taut, and the extensible warp threads are held under tension, with the extensible body warp threads held under approximately 50% greater tension than that of the exposed extensible warp threads whereby the tensions of the extended warp threads in the webbing are balanced.

5. The method of weaving a slip-resisting elastic webbing having inextensible body warp threads, extensible body warp threads and exposed extensible warp threads raised above the body of the webbing, which consists in interweaving a filling yarn with said warp threads, wherein during the weaving the inextensible body warp threads are held taut, the extensible body warp threads are stretched to approximately 70% of their maximum elastic limit, and the extensible warp threads having exposed portions raised above the surface of the webbing are stretched to approximately 50% of their maximum elastic limit, whereby the tensions of the extended warp threads in the webbing are balanced.

6. The method of weaving a slip-resisting elastic webbing having a series of inextensible body warp threads, extensible body warp threads and exposed extensible warp threads raised above the body of the webbing, which consists in interweaving a filling yarn with said warp threads, wherein during the weaving the inextensible body warp threads are held taut, the extensible body warp threads are held under a tension approximating 70% of their maximum elastic limit, and the extensible warp threads having exposed portions raised above the surface of the webbing are held under tension approximating 50% of their maximum elastic limit.

7. The method of weaving a slip-resisting elastic webbing having a series of inextensible body warp threads, extensible body warp threads and exposed extensible warp threads raised above the body of the webbing on both sides thereof, which consists in interweaving a filling yarn with said warp threads wherein during the weaving the inextensible body warp threads are held taut, the extensible body warp threads are held under a tension approximating 70% of their maximum elastic limit and the extensible warp threads having exposed portions raised on both sides above the surface of the webbing are held under tension approximating 50% of their maximum elastic limit.

8. A slip-resisting elastic webbing comprising, in combination, a textile backing having inextensible and extensible body warp threads covered by an interwoven weft thread, and a slip-resisting structure raised thereon comprising extensible warp threads having exposed portions raised above the surface of the backing on both sides thereof.

9. A slip-resisting elastic webbing having, in combination, covered elastic and non-elastic warp threads, comprising the body of the webbing, elastic warp threads having exposed portions raised above the surface of the webbing, and weft threads interwoven with said warp threads; wherein the elastic warp threads are held under tension, with the elastic body warp threads held under a tension greater than that of the exposed elastic warp threads, and whereby the tensions therein are balanced to form a flat webbing.

10. A slip-resisting elastic webbing having, in combination, covered elastic and non-elastic warp threads comprising the body of the webbing, elastic warp threads having exposed portions raised above the surface of the webbing, and weft threads interwoven with said warp threads, wherein the elastic warp threads are held under tension, with the elastic body warp threads held under a proportionately greater tension than that of the exposed elastic warp threads, and in a proportion approximating 3 to 2 and whereby the tensions therein are balanced to form a flat webbing.

11. A slip-resisting elastic webbing comprising, in combination, a textile backing having inextensible and extensible body warp threads covered by an interwoven weft thread, and a slip-resisting structure raised thereon comprising extensible warp threads having exposed portions raised above the surface of the backing on both sides thereof, wherein the extensible warp threads are held under tension, with the extensible body warp threads held under a tension greater than the exposed extensible warp threads, and whereby the tensions therein are balanced.

12. A slip-resisting elastic webbing comprising, in combination, a textile backing having inextensible and extensible body warp threads covered by an interwoven weft thread, and a slip-resisting structure raised thereon comprising extensible warp threads having exposed portions raised above the surface of the backing on both sides thereof, wherein the extensible warp threads are held under tension, with the extensible body warp threads held under a tension approximating 50% greater than the exposed extensible warp threads, and whereby the tensions therein are balanced.

DONALD G. POSSON.

References Cited in the file of this patent

UNITED STATES PATENTS

| Number | Name | Date |
| --- | --- | --- |
| 1,322,708 | MacPherson | Nov. 25, 1919 |
| 1,666,686 | Chisholm | Apr. 17, 1928 |
| 1,755,787 | Moore | Apr. 22, 1930 |
| 1,796,041 | Moore | Mar. 10, 1931 |
| 2,222,150 | Moore | Nov. 19, 1940 |